Jan. 21, 1941.   J. C. KOCI   2,229,295

BALL OBJECTIVE

Filed Feb. 29, 1940

Jerry C. Koci
INVENTOR.

BY Clarence E. Threedy
HIS ATTORNEY.

UNITED STATES PATENT OFFICE 2,229,295

BALL OBJECTIVE

Jerry C. Koci, Chicago, Ill., assignor to Chicago Coin Machine Mfg. Co., Chicago, Ill., a corporation of Illinois Application February 29, 1940, Serial No. 321,383

6 Claims. (Cl. 273—118)

This invention relates broadly to amusement apparatus and particularly various ball rolling games, one of the principal objects being the provision of a ball objective or target suitable for use with a ball playing board and operable to provide an illuminated objective or target area at which the ball is to be directed, there being means situated with respect to said area for engagement by the ball when successfully directed thereat to control a lamp or other illuminating device which will give an indication of a successful play.

Viewed from another aspect, it is an object of the invention to provide a ball objective including a translucent member and means mounting the same flush with the playing surface of a ball playing board or the like, means for illuminating said member to define a ball objective or target, and means for controlling the illuminating means and including an operating element mounted with respect to said translucent member so as to be engaged and operated by a ball successfully directed thereat to control an energizing circuit for the illuminating means and give an indication of the successful play.

A more particular object is the provision of a ball objective including a translucent member adapted to be mounted flush with the playing surface of a ball rolling board or the like, a lamp illuminating said member from beneath, a switch controlling an energizing circuit for the lamp, and a switch operating element mounted with a portion exposed from the upper surface of the translucent member so as to be engaged and moved by a ball to operate the switch and vary the illumination of the translucent member to indicate a hit or attaining of the objective.

Other objects, advantages and novel aspects of the invention reside in certain details of construction as well as the cooperative relationship of the component parts of the illustrative embodiment described hereinafter in view of the annexed drawing, in which.

Figure 1:
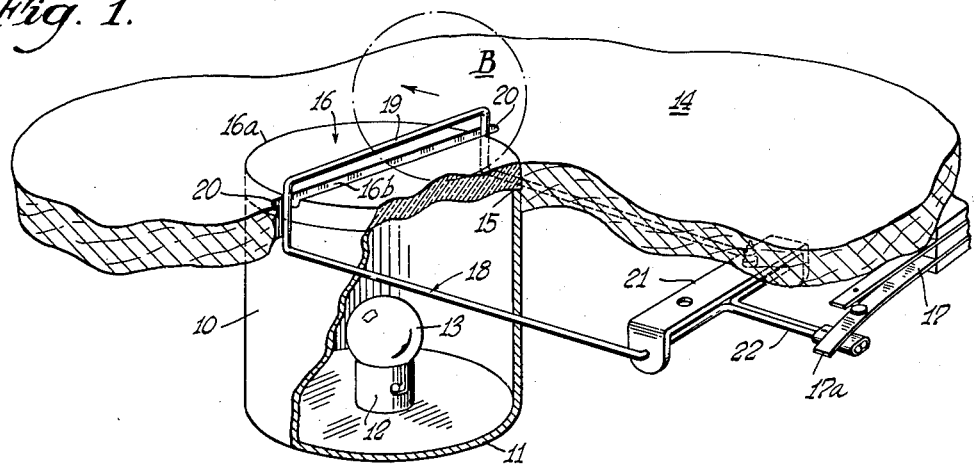
Fig. 1 is a fragmentary perspective of one form of the objective with portions cut away.

Referring to Fig. 1, a preferred form of the objective includes a cylindrical lamp housing 10 having a bottom portion 11 upon which is mounted a lamp socket 12 removably seating a light source in the form of an electric lamp 13.

The upper end of the housing is open and is fitted tightly into a receiving hole in a ball playing board 14, and while other mounting means obviously may be employed, a tight frictional fit is satisfactory for most installations, the upper peripheral edge portion 15 of the cylinder or housing resting a distance below the top surface of the board to accommodate a translucent member in the form of a disc 16 of translucent, and preferably colored, plastic or the like, which is fitted into the mounting hole with its upper surface 16a flush with the surface of board 14 so as not to impede the passage thereover of the ball B.

Means for giving an indication of a successful play includes the provision of a control device in the nature of a switch 17 conveniently mounted on the underside of the board, and a switch operating member including a rigid wire yoke 18 having a bight portion 19 offset to project through diametrically opposite holes 20 in the board at opposite sides of the translucent member or disc, the yoke being pivotally mounted in a bracket 21 and provided with an extension or arm 22 operatively engaging one of the contacts 17a of the switch to close the latter when the bight portion 19 is depressed, as by the passage thereover of the ball B.

In order that no substantial impedance shall be offered to the ball in moving over the objective, the disc or translucent member 16 is provided with a diametric groove 16b of a depth sufficient to permit an operating means or bight portion 19 to seat therein flush with the surface 16a of the disc so that the ball may roll freely thereover. It will be observed that switch 17 is normally open for reasons to be explained in view of the circuit of Fig. 4. However, this switch may be closed normally and opened momentarily by arm 22 responsive to the passage of a ball over the control means 19.

Figure 2:
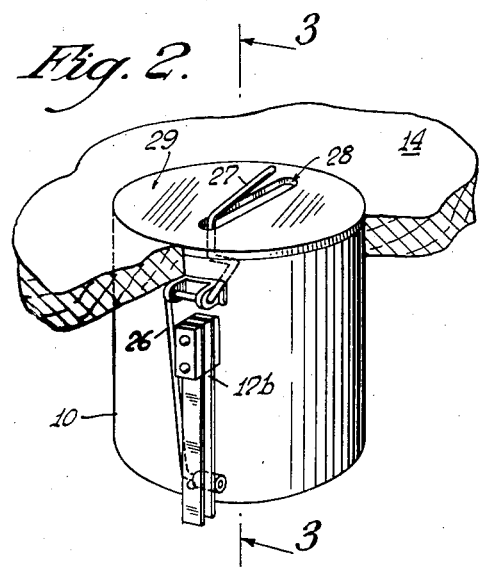
Fig. 2 is a perspective of a modified form of objective showing a fragment of the ball rolling board.
Figure 3:
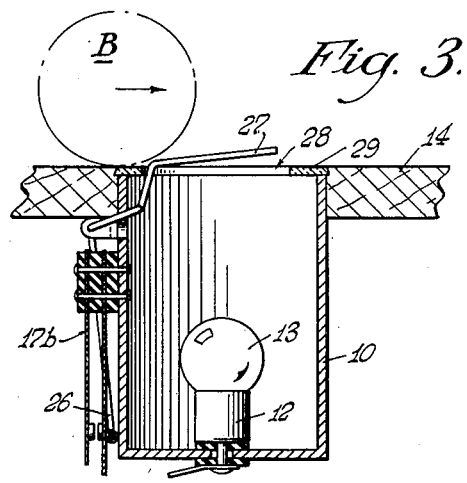
Fig. 3 is a vertical section along lines 3—3 of Fig. 2.

In the modified arrangement of Figs. 2 and 3, the ball objective includes the cylindrical housing 10 provided with a lamp 13 and fitted tightly into a mounting hole in the board 14. In this arrangement, however, the control switch 17b is conveniently mounted on the side of the housing and is provided with a pivoted operating arm 26 having an offset actuating extension 27 disposed to project through a diametrically extending slot 28 cut in the central portions of a translucent disc 29 mounted with its upper surface flush with the playing board 14 as in the case of the device of Fig. 1.

In the arrangement of Figs. 2 and 3, the control or operating means 27 is disposed so that the ball must be more skillfully directed at the target defined by the spot of light delineated by the translucent disc 29, and upon being engaged by the ball, it is depressed sufficiently into the slot 23 to permit the ball to roll freely over the disc and operate the switch 17b.

Figure 4:
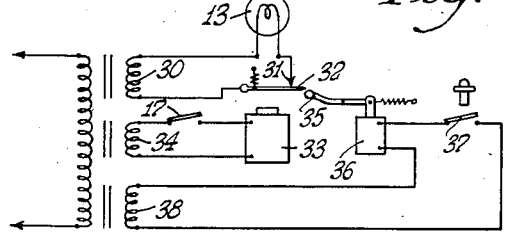
Fig. 4 is a circuit diagram.

One of the preferred methods for connecting the control switch for the several modifications of Figs. 1 and 2 is shown in Fig. 4, wherein the lamp 13 has one of its terminals connected to a power source in the nature of a secondary winding 30 of a transformer, the remaining lamp terminal being connected to the remaining terminal of winding 30 through a relay contact 31 normally engaged by armature contact 32 of a control or tripping relay. Thus, the lamp 13 may be normally energized, the illumination of the same being varied, as for example, by extinction, responsive to the passage of a ball over the operating element 19 in the device of Fig. 1, or over the operating element or finger 27 in the device of Fig. 2, to actuate either of the switches 17 or 17b.

In the circuit diagram of Fig. 4, the tripping relay includes a winding 33, one terminal of which is connected to a power source in the form of another transformer secondary winding 34, the remaining terminal of which is connected to one of the contacts of either of the switches 17 or 17b, designated generally as 17 in the circuit, the remaining contact being connected to the remaining terminal of the relay winding so that as a result of a closing of either of the switches 17 or 17b by the passage of a ball relative to the target area as aforesaid, winding 33 will be energized to withdraw the armature 32 from engagement with contact 31, thus breaking the circuit for lamp 13, armature 32 preferably locking under the offset arm 35 of the resetting solenoid 36.

In order to restore the lamp 13 to energized condition, a push button switch 37 may be closed to connect power from another secondary winding 38 to the solenoid 36 to rock the locking portion 35 and permit armature 32 to restore to normal condition.

The various advantages and objects of the invention may be accomplished by modifications of the particular embodiment specifically described herein, and it is intended that the appended claims shall include all equivalent arrangements fairly coming within their call.

Having thus described my invention, what I claim as new and desire to protect by Letters Patent is:

1. The combination with means defining a ball playing surface of a ball objective including a translucent member mounted flush with said surface so that a ball may pass freely thereover, means for illuminating said translucent member to designate the same as a ball objective, and switch means adapted for connection in an energizing circuit for said illuminating means and including an operating element situated with respect to said translucent member to be engaged and operated by a ball passing in a predetermined proximity to said translucent member to vary said illuminating means to give an indication of said passage of the ball.

2. In a ball playing game, the combination with means providing a ball playing surface, of a ball objective including a translucent member having a surface portion mounted flush with said first-mentioned surface whereby to permit free passage of a ball over said surfaces, an electric lamp arranged to illuminate said translucent member, a switch connected to control an energizing circuit for said lamp, and switch operating means mounted for movement from a normal position, where it can be engaged by a ball passing over said translucent surface in a direction toward said translucent member out of the way of said ball when engaged by the same to permit passage of said ball over said surface and to vary the illumination of said lamp to give an indication of said passage.

3. In a ball playing game, the combination with a ball rolling board, of a ball objective including a translucent disc mounted in said board and having an upper surface portion flush with the ball rolling surface of the board, an electric lamp arranged to illuminate said disc from beneath the board, a switch connected in an energizing circuit for said lamp, and a switch operating member projecting above said upper surface of the disc to be engaged by a ball passing thereover and mounted for movement upon contact by said ball in a direction generally downward toward said disc out of the way of 4. In a ball rolling game including a ball rolling surface, a ball objective including a translucent disc mounted in said surface and having an upper surface portion flush with said first-mentioned surface, said disc having a groove in said upper surface thereof, a switch operating member yieldably disposed above said groove for engagement by a ball passing onto said surface and arranged to be moved by said ball into said groove out of the way of said ball to actuate a switch, a switch actuated by said operating member, an electric lamp arranged to illuminate said disc from beneath said first-mentioned surface and connected in an energizing circuit with said switch to have its luminosity varied by operation thereof responsive to engagement and operation of said switch operating member by a ball as aforesaid.

5. In a ball rolling game including a ball rolling surface, the combination of a ball objective including a translucent disc mounted flush in said surface, electric lamp means arranged to illuminate said disc from beneath said surface, a switch connected in an energizing circuit for said lamp, said disc having a slot cut therethrough, and a switch operating device projecting through said slot upwardly of said surface to be engaged by a ball passing onto the disc, said operating device being moved by said ball into said slot out of the way of the ball, said switch being actuated by engagement of said ball with said operating device to vary the illumination of said lamp for the purpose of indicating the passage of said ball in a predetermined proximity to said disc.

6. A device of the class described comprising, in combination, a translucent member mounted with a ball receiving surface approximately flush with a ball rolling surface, means for illuminating said translucent member, and a control device including an operating element projecting in a direction from beneath said surfaces into the region of the ball receiving surface of the translucent member to be engaged by a ball on said receiving surface to actuate said control device.

JERRY C. KOCI.

Certificate of Correction

Patent No. 2,229,295

January 21, 1941

JERRY C. KOCI

It is hereby certified that error appears in the printed specification of the above numbered patent requiring correction as follows:

Page 2, second column, line 28, after "way of" insert the words and period *said ball to vary the illumination of said lamp.*;

and that the said Letters Patent should be read with this correction therein that the same may conform to the record of the case in the Patent Office.

Signed and sealed this 4th day of April, A. D. 1950.

[SEAL]

THOMAS F. MURPHY,
*Assistant Commissioner of Patents.*